Dec. 20, 1938.  L. BERTELE  2,140,979
CONDENSER LENS SYSTEM
Filed Jan. 27, 1937
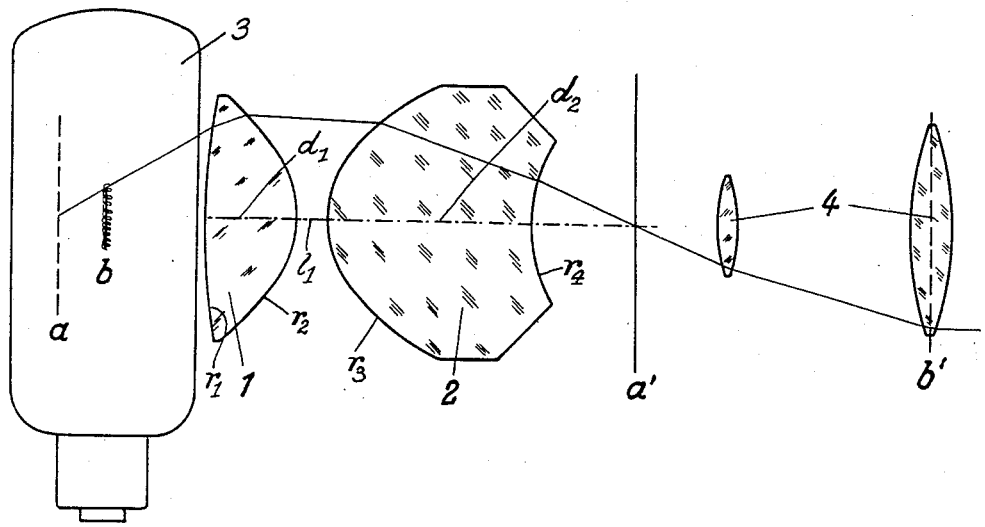
Inventor:
Ludwig Bertele
by B. Singer
Attorney Patented Dec. 20, 1938

2,140,979

UNITED STATES PATENT OFFICE 2,140,979

CONDENSER LENS SYSTEM

Ludwig Bertele, Dresden, Germany, assignor to Zeiss Ikon Aktiengesellschaft, Dresden, Germany Application January 27, 1937, Serial No. 122,509
In Germany August 30, 1935

3 Claims. (Cl. 88—24)

The invention relates to improvements in condenser lens systems and in particular pertains to a condenser lens system composed of two lens units and adapted to be used in combination with the projecting lens system of a projector.

It is an object of the invention to provide a condenser which copies an imaginary plane behind the filament of the lamp into the plane of the picture window, whereby simultaneously the filament itself is copied approximately in the pupil of the projecting lens system.

Mathematical calculations have disclosed that it is necessary to provide the condenser with a short focal length, in order to avoid opening proportions which are too large for the same. It has been discovered that conventional condensers can not be used, because it is not possible to bring the filament of high candle powered lamps sufficiently close to the main point of the condenser, without the glass bulb touching the front face of the condenser lens. In lamps of low candle power it is possible to move the filament out of the center of the glass bulb toward the condenser, but in lamps of high candle power this is not possible without endangering the durability of the glass bulb.

Another object of the invention is now to move the condenser optically closer to the filament of the lamp and this is accomplished by displacing the main point of the condenser toward the lamp.

In accordance with another object of the invention, one lens unit of the condenser, namely the one which is positioned adjacent the lamp, consists of a collective lens whose face directed toward the second lens unit has a smaller radius of curvature than the other face which faces the lamp. The second lens unit of the condenser consists of a meniscus shaped collective lens curved substantially toward the lamp and having at its center a thickness which is at least as large or larger than the thickness of the first lens unit. The thickness of the center of the first lens unit should be kept as small as possible, as otherwise the favorable action upon the position of the main point of the condenser will be lost again.

The drawing illustrates diagrammatically and by way of example one embodiment of the condenser lens system and its arrangement between a luminous source and a projecting lens system.

The condenser lens system as illustrated in the drawing is of correct proportion to be used for the projection of miniature films with a lamp 3 having its filament positioned in the center plane $b$ of the glass bulb. The size of the filament is 7,5 . 7,5 mm. The condenser is adapted to completely illuminate a projecting lens system of 1:1,4.

In particular the condenser lens system is composed of collective lens unit 1 and a meniscus forming lens unit 2. The concave face $r_4$ of the second lens unit 2 is arranged opposite the picture window indicated at $a'$. The filament of the lamp 3 is arranged in the plane $b$. The projecting lens system is designated with 4.

The optical data of the condenser lens system, by way of example, may be as follows:

$$f=15 \text{ mm.}$$

Front main point located 4 mm. behind $r_1$.
Lens unit 1:

$r_1=+100$          $d_1=18,00$
$r_2=-17,6$ (deformed)   $n_d=1,50$

Lens unit 2:

$r_3=+20,8$ (deformed)   $d_2=34,00$
$r_4=+24,2$          $n_d=1,516$
$l_1=5$

It will be noted that the faces $r_2$ and $r_3$ are deformed. This has been done to obtain a sufficiently large opening ratio of the condenser.

The optical performance of the condenser is as follows:

The filament in the plane $b$ is copied into the pupil of the lens $b'$ of the projecting lens system 4, and the plane $a$ behind the filament is copied into the plane of the picture window $a'$.

What I claim is:

1. A condenser lens system adapted to be arranged between the lamp and the projection aperture of a projector, comprising two axially alined lens units, the first unit being collective and positioned adjacent the lamp, both exterior faces of said first lens unit being convex, the face directed toward the second lens unit having a radius of about 1,1 times the focal length of the system, the face toward the lamp having a radius of about 6,0 times such focal length, and the axial thickness of said first lens unit being about 1,2 times such focal length, and the second lens unit being a meniscus shaped collective lens curved with its convex surface toward the lamp and positioned between said first lens unit and the projection aperture, the concave face of said second lens unit having a radius of about 1,6 times the focal length of said system, while the convex face has a radius of about 1,4 times said focal length, the axial thickness of said second lens unit being about 2,2 times said focal length, the concave face of said second lens unit being arranged opposite said projection aperture, the convex faces of the lens units facing each other being deformed at their outer edges, the axial separation distance between the two lens units being about .3 times said focal length.

2. A condenser lens system adapted to be arranged between the lamp and the projection aperture of a projector, comprising two axially alined lens units, the first unit being collective and positioned adjacent the lamp, both exterior faces of said first lens unit being convex, the face directed toward the second lens unit having a radius of about 1,1 times the focal length of the system, the face toward the lamp having a radius of about 6,0 times such focal length, and the axial thickness of said first lens unit being about 1,2 times such focal length, and the second lens unit being a meniscus shaped collective lens curved with its convex surface toward the lamp and positioned between said first lens unit and the projection aperture, the concave face of said second lens unit having a radius of about 1,6 times the focal length of said system, while the convex face has a radius of about 1,4 times said focal length, the axial thickness of said second lens unit being about 2,2 times said focal length, the concave face of said second lens unit being arranged opposite said projection aperture, the convex faces of the lens units facing each other being deformed at their outer edges, the axial separation distance between the two lens units being about .3 times said focal length and the refractive index of said second lens unit exceeding that of said first lens unit by .016.

3. A condenser lens system adapted to be arranged between the lamp and the projection aperture of a projector, comprising two axially alined lens units, the first lens unit being collective and positioned adjacent the lamp, both exterior faces of said first lens unit being convex, the face directed toward the second lens unit having a smaller radius of curvature than the face toward the lamp, the axial thickness of said first lens unit being substantially as large as the focal length of the lens system to displace the principal point of the condenser system as near as possible toward the lamp, and the second lens unit being a meniscus shaped collective lens curved with its convex surface toward the lamp and positioned between said first lens unit and the projection aperture, said second lens unit having an axial thickness at least as large as the axial thickness of the first lens unit, but not larger than twice the axial thickness of the same, the concave face of said second lens unit being arranged opposite said projection aperture, the convex surfaces of said two lens units facing each other having the shorter radii and being deformed, the axial separation distance between the two lens units being about one third the focal of the system as a whole.

LUDWIG BERTELE.